(12) United States Patent
Dunning et al.

(10) Patent No.: US 10,917,679 B2
(45) Date of Patent: Feb. 9, 2021

(54) VIDEO RECORDING OF A DISPLAY DEVICE

(71) Applicant: INTERNATIONAL BUSINESS MACHINES CORPORATION, Armonk, NY (US)

(72) Inventors: Jack E. Dunning, Lyndhurst (GB); Thomas J. Latham, Eastleigh (GB); Jordan R. Cain, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/377,133

(22) Filed: Apr. 5, 2019

(65) Prior Publication Data

US 2020/0322669 A1 Oct. 8, 2020

(51) Int. Cl.
*H04N 21/274* (2011.01)
*H04N 21/6587* (2011.01)
*H04N 5/765* (2006.01)
*G06K 9/00* (2006.01)
*H04N 21/4147* (2011.01)

(52) U.S. Cl.
CPC ....... *H04N 21/274* (2013.01); *G06K 9/00671* (2013.01); *H04N 5/765* (2013.01); *H04N 21/4147* (2013.01); *H04N 21/6587* (2013.01)

(58) Field of Classification Search
None
See application file for complete search history.

(56) References Cited

U.S. PATENT DOCUMENTS

| 10,121,513 B2* | 11/2018 | Martinez ............ G06K 9/00744 |
| 2004/0194128 A1* | 9/2004 | McIntyre ................ H04L 9/085 725/32 |
| 2012/0033876 A1 | 2/2012 | Momeyer et al. |
| 2014/0205259 A1 | 7/2014 | Kamity et al. |
| 2018/0091860 A1 | 3/2018 | Stokking et al. |

OTHER PUBLICATIONS

Epiphan, "How to Live Stream Multiple Sources Simultaneously," Epiphan Video, p. 1-7, https://www.epiphan.com/solutions/how-to-live-stream-multiple-sources-simultaneously/, Accessed on Apr. 3, 2019.
Mell et al., "The NIST Definition of Cloud Computing," National Institute of Standards and Technology, Sep. 2011, p. 1-3, Special Publication 800-145.

* cited by examiner

*Primary Examiner* — Fernando Alcon
(74) *Attorney, Agent, or Firm* — Rakesh Roy

(57) ABSTRACT

A method, computer system, and a computer program product for video recording of a display device is provided. The present invention may include, recording, with a recording device, a source video having a field of view. The present invention may include, responsive to a record command, controlling a display device to generate a display recording of a visual content displayed by the display device. The present invention may include, obtaining the source video and the display recording. The present invention may include, responsive to the visual content displayed by the display device being visible in the field of view of the source video, incorporating the display recording into the source video so as to replace the visual content displayed by the display device visible in the source video with the display recording.

20 Claims, 8 Drawing Sheets

VIDEO RECORDING OF A DISPLAY DEVICE

BACKGROUND

The present invention relates generally to the field of computing, and more particularly to video capturing technology.

Due to the ubiquity of display devices, it may frequently occur that a video recording of a scene includes a display device displaying visual content (on a screen) within a field of view of the video recording. Although this may be unintentional, it is also common for a screen displaying visual content to be intentionally captured in video recording, for example so that the visual content displayed on the screen may be conveyed to a viewer of the video recording.

SUMMARY

Embodiments of the present invention disclose a method, computer system, and a computer program product for incorporating content displayed by a display device into a video recording of the display device. The present invention may include, recording, with a recording device, a source video having a field of view. The present invention may include, responsive to a record command, controlling a display device to generate a display recording of a visual content displayed by the display device. The present invention may include, obtaining the source video and the display recording. The present invention may include, responsive to the visual content displayed by the display device being visible in the field of view of the source video, incorporating the display recording into the source video so as to replace the visual content displayed by the display device visible in the source video with the display recording.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
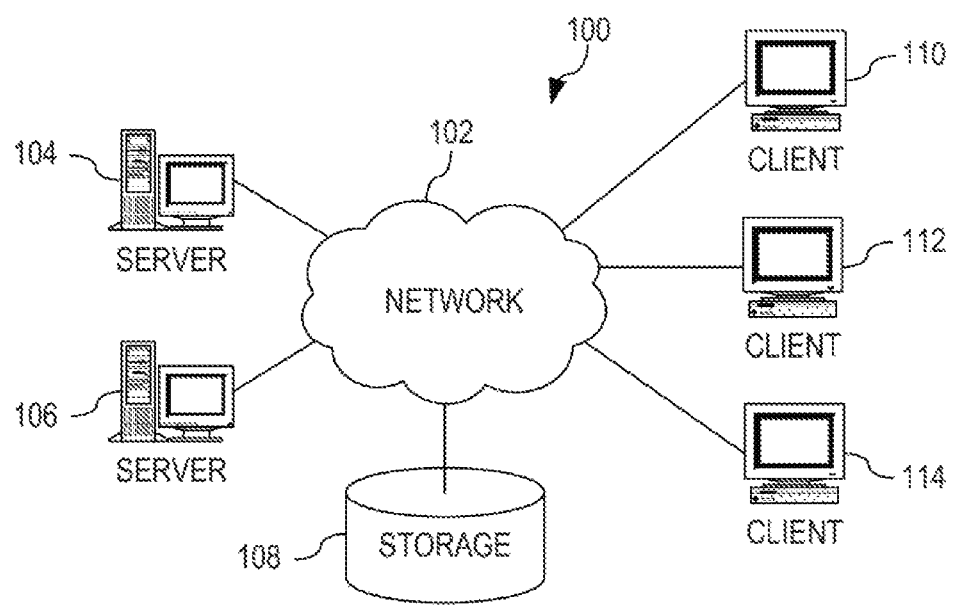
FIG. 1 illustrates a distributed computer system according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a system, method and program product for replacing visual content of a display device that is visible in a video recording with a recording of the visual content made by the display device. As such, the present embodiment has the capacity to improve the technical field of video recording by capturing the displayed visual content (e.g., graphical elements, images, texts) at its source (e.g., at the display device), such that an original, un-altered, and high quality version of the visual content can be made available and incorporated (e.g., interlaced, overlaid etc.) within the video recording. In this way, the visual content displayed by the display device can be represented at high-quality within the video recording.

As previously described, due to the ubiquity of display devices, it may frequently occur that a video recording of a scene includes a display device displaying visual content (on a screen) within a field of view of the video recording. Although this may be unintentional, it is also common for a screen displaying visual content to be intentionally captured in video recording, for example so that the visual content displayed on the screen may be conveyed to a viewer of the video recording.

A drawback, however, is that in such a video recording, the visual content displayed on the screen is typically represented poorly in the video recording. There may be a variety of reasons for this, including but not limited to: interference between the sensor raster of the video recording device and the screen causing Moiré effects (spatial interference); a mismatch between the refresh rate of the screen and the sampling rate of the video recording device (temporal interference); the dynamic range of the scene and lighting conditions; relative motion/movement of the video recording device and the screen; the quality of the video recording device used for the video recording; recording artifacts (tearing; aliasing; interlacing); encoder settings in case of the media recording being encoded; viewing angle of the video recording device with respect to the screen.

To improve the quality of the displayed visual content in the video recording, it is known to increase the quality of the video recording, e.g., by increasing the recording resolution, framerate and/or video quality. Disadvantageously, this may lead to a larger size camera recording. This may be undesirable or impossible due to bandwidth or storage constraints and may not be possible when using generally available current-day video recording devices such as smartphones or tablets, which do not contain such high-quality camera functions. Moreover, even when feasible, an increase in recording quality does not address problems such as dynamic range problems.

Accordingly, visual content is captured at its point/source of display and then made available for incorporation in a video recording of the visual content. This may enable poorly represented visual content within a video recording to be replaced with a higher-quality representation of the visual content.

Embodiments may be implemented in conjunction with video processing or editing systems to automatically generate improved video recordings of scenes that include visual content displayed on a screen within the scene, thereby aiding high-quality video production. Furthermore, capture/recording of the visual content displayed by the display device within the scene may be controlled (e.g., responsive to a command signal) so that the appropriate (e.g., correct, relevant or correctly timed) visual content is captured. For example, a user may provide a visual and/or audible command (such as a gesture or voice command) to prompt the capture/recording of the visual content displayed by the display device. In this way, embodiments may be adapted to be controlled by user via natural, intuitive or convenient methods.

Embodiments may facilitate the generation of a modified (e.g., improved) video recording of a scene containing visual content displayed on a display device. This may be achieved by obtaining a recording of the visual content from the display device. The recording of the visual content may then be incorporated (e.g., overwriting, interlacing) into the video recording of the scene (i.e., the source/original video) so as to replace the visual content that is visible in the (source/original) video recording. Embodiments may therefore assist in creating an improved video recording of scene that includes a display device displaying visual content.

A tool for enabling automated improvement or optimization of displayed visual content within a video recording may therefore be provided by a proposed embodiment. This may be used to edit or produce video recordings. It may also facilitate the provision of visual content displayed by a display device via a live (e.g., streamed) recording of an environment containing the display device. Embodiments may therefore solve problems associated with taking a video recording of a screen of a display device which would otherwise result in poor/low-quality reproduction of visual content displayed on the screen.

By way of example, proposed embodiments may include generating a record command and communicating the record command to the display device. In this way, generation of a display recording of visual content displayed by the display device may controlled, thereby avoiding unnecessary display recordings being made. Storage and/or data transmission requirements may therefore be reduced. Alternatively, or additionally, a record command may be provided by a user (e.g., via a user interface, or as a spoken instruction), thus enabling a user to control generation of a display recording of visual content displayed by the display device.

In some embodiments, generating a record command may comprise: processing the source video with an object recognition algorithm to detect if the visual content displayed by the display device is visible in the field of view of the source video; and generating a record command based on the detection result. This may facilitate automation of embodiments and thereby avoid a need for human or external control. For instance, an image/object recognition library may be leveraged to detect the presence of a display device in the field of view of the source video (recorded by the recording device). Upon such detection, a display recording of visual content displayed by the display device may be started. Similarly, when it is detected that the display device is no longer in the field of view of the source video, the display recording of visual content displayed by the display device may be stopped. Capture of extraneous or incorrect visual content at the display device may thus be avoided by taking such an approach.

Some embodiments may further comprise: communicating a device identifier from the display device to the control unit; and responsive to receiving the device identifier, establishing a communication link with the display device for communicating a record command. For example, the device identifier may comprise at least one of: a quick response (QR) code; a barcode; machine-readable identifier; wireless identification tag; and a radio-frequency identification (RFID). In this way, a display device may be 'discovered' and identified, and this may assist in the process of obtaining a display recording of visual content displayed by the display device. It may also help to ensure that the correct/appropriate display recording for each display device is obtained and used when multiple display devices are visible in the source video (e.g., within its field of view).

Embodiments may further comprise: detecting motion of at least one of the recording device and the display device; generating a motion signal based on detected motion; and generating a record command based on the generated motion signal. By way of example, this may enable control of display recording generation so that visual content of the display device is only captured when the recording device or display moves. Such an approach may be useful for replacing content of the source video that is blurred as a result of relative movement between the recording device and display device.

To assist in the correct or accurate incorporation of the display recording into the source video, the display recording may comprise one or more timestamps. Put another way, incorporating the display recording into the source video may be based on the one or more timestamps provided by/with the display recording.

Accordingly, proposed embodiments may provide a tool or concepts for assisting in the creation of improved video recordings that contain higher quality representation of visual content displayed by a display device visible in video recording. This may help to create a video recording that incorporate multiple display recordings from display devices within the field of view of the recording.

Embodiments may be useful for a wide range of applications, such as live video streaming, video conferencing, movie/film production, amateur video content creation, etc.

Reference to a display device may be taken to refer to a device that comprises a display screen (or "screen") adapted to display visual content to a viewer. Examples of such display devices may include televisions, monitors, tablet devices, and smartphones. Further, examples of display devices may include devices having two-dimensional, three-dimensional, light field and holographic displays, and also to devices including projection screens and other types of surfaces on which visual content may be rendered, as well as to other types of visual rendering of visual content.

By way of further example, embodiments may propose extensions to existing video recording systems and/or video editing systems. Such extensions may enable a video recording system to provide additional functionality by leveraging proposed concepts for example. In this way, a conventional video recording system or video editing system may be upgraded by implementing or "retro-fitting" a proposed embodiment.

Illustrative embodiments may provide concepts for interlacing high quality representations of display visual content into video recordings, and such concepts may be done automatically and in real-time. Dynamic video manipulation concepts may therefore be provided by proposed embodiments. Modifications and additional steps to a traditional video recording system may also be proposed which may enhance the value and utility of the proposed concepts.

Referring to FIG. 1, an exemplary distributed system 100 in accordance with one embodiment is depicted. Distributed system 100 may include a network of computers in which aspects of the illustrative embodiments may be implemented. The distributed system 100 may contain at least one network 102, which may provide communication links between various devices and computers connected together within the distributed system 100. The network 102 may include connections, such as wired, wireless communication links, or fiber optic cables.

In the depicted example, a first 104 and second 106 servers may be connected to the network 102 along with a storage unit 108. In addition, clients 110, 112, and 114 may also be connected to the network 102. The clients 110, 112, and 114 may be, for example, personal computers, network computers, or similar computing devices. In the depicted example, the first server 104 may provide data, such as boot files, operating system images, and applications to the clients 110, 112, and 114. Clients 110, 112, and 114 may include clients to the first server 104 in the depicted example. The distributed processing system 100 may include additional servers, clients, and other devices not shown.

In the depicted example, the distributed system 100 may include the Internet within the network 102, representing a worldwide collection of networks and gateways that may use a Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
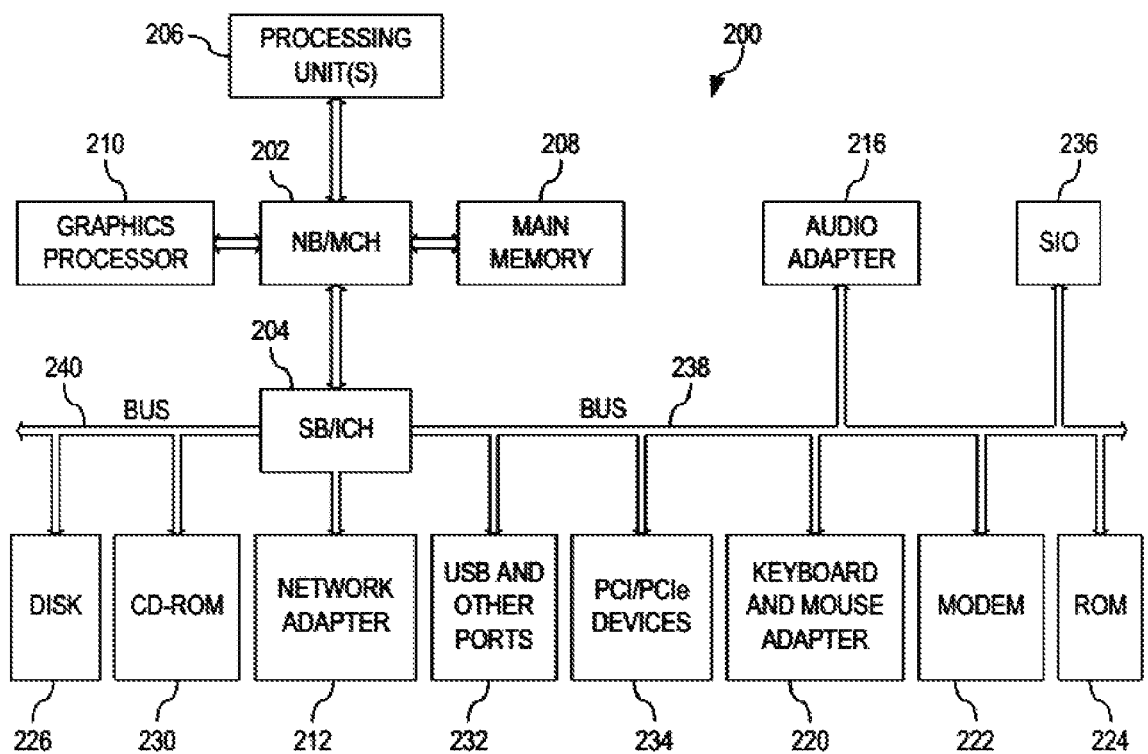
FIG. 2 is a block diagram of an example system in which aspects of the illustrative embodiments may be implemented according to at least one embodiment.

Referring to FIG. 2, a block diagram of an example system 200 in which aspects of the illustrative embodiments may be implemented in accordance with one embodiment is depicted. The system 200 may include an example of a computer, such as client 110 depicted in FIG. 1, in which computer usable code or instructions implementing the processes for illustrative embodiments of the present invention may be located.

In the depicted example, the system 200 may employ a hub architecture including a north bridge and memory controller hub (NB/MCH) 202 and a south bridge and input/output (I/O) controller hub (SB/ICH) 204. A processing unit 206, a main memory 208, and a graphics processor 210 may be connected to NB/MCH 202. The graphics processor 210 may be connected to the NB/MCH 202 through an accelerated graphics port (AGP).

In the depicted embodiment, a local area network (LAN) adapter 212 may connect to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 may connect to the SB/ICH 204 through first bus 238 and second bus 240. PCI/PCIe devices may include, for example, Ethernet adapters, add-in cards, and PC cards for notebook computers. PCI may use a card bus controller, while PCIe may not. ROM 224 may be, for example, a flash basic input/output system (BIOS).

The HDD 226 and CD-ROM drive 230 may connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system may run on the processing unit 206. The operating system may coordinate and provide control of various components within the system 200 in FIG. 2. As a client, the operating system may be a commercially available operating system. An object-oriented programming system, such as the Java™ (Java and all Java-based trademarks and logos are trademarks or registered trademarks of Oracle Corporation and/or its affiliates) programming system, may run in conjunction with the operating system and provides calls to the operating system from Java™ programs or applications executing on system 200.

As a server, system 200 may be, for example, an IBM® eServer™ System p® (IBM, IBM eServer, IBM System P, and all IBM-based trademarks and logos are trademarks or registered trademarks of International Business Machines Corporation and/or its affiliates) computer system, running the Advanced Interactive Executive (AIX®) (AIX and all AIX-based trademarks and logos are trademarks or registered trademarks of International Business Machines Corporation and/or its affiliates) operating system or the LINUX® (LINUX and all LINUX-based trademarks and logos are trademarks or registered trademarks of the Linux Foundation and/or its affiliates) operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed embodiment may allow for seamless integration of a video recording and one or more display recordings of display visual content. This may be done using identifiers provided on or by the display devices to identify and instruct the display devices to generate and provide display recordings.

Figure 3:
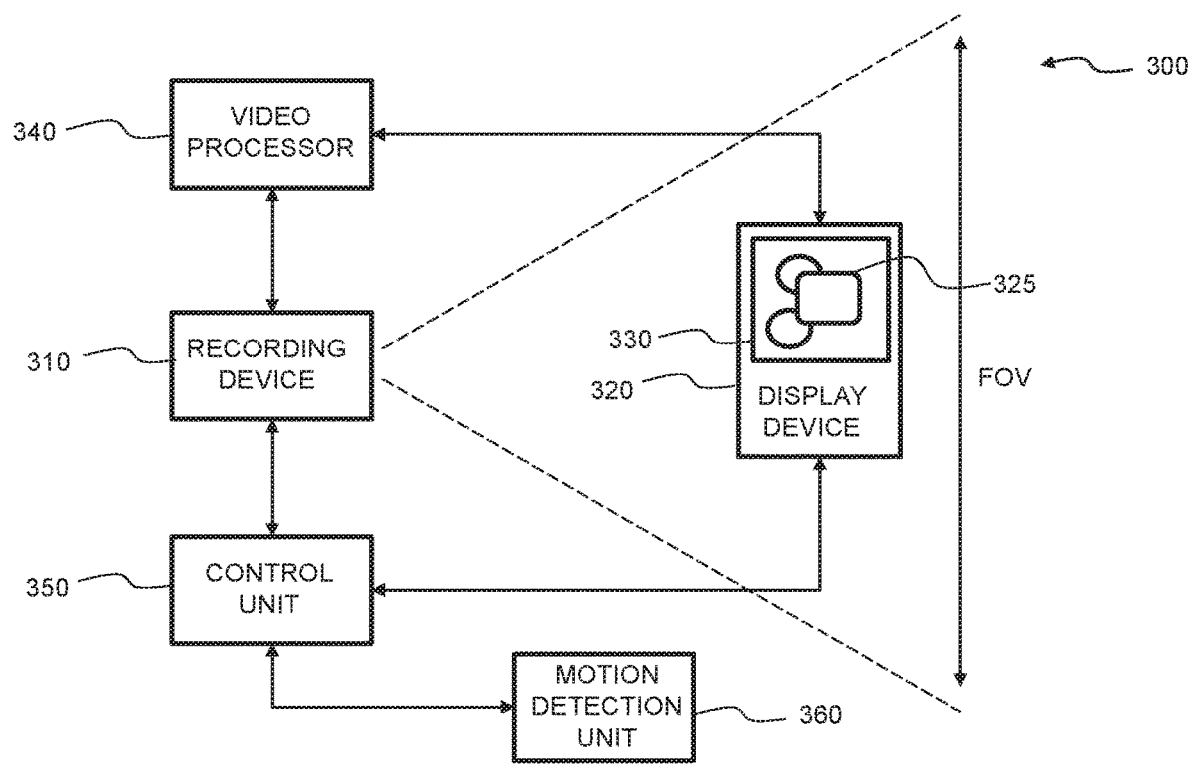
FIG. 3 is a block diagram of a system for incorporating content displayed by a display device into a video recording of the display device according to at least one embodiment.

Referring to FIG. 3, a block diagram of an exemplary embodiment of a system 300 for incorporating content displayed by a display device into a video recording of the display device according to at least one embodiment is depicted.

The system 300 may include a recording device 310 configured to record a source video having a field of view (FOV).

The system 300 may also include a display device 320 configured to display visual content 325 to a user/viewer. In this example, the display device 320 may include a display screen 330 that is configured to display visual content 325 comprising graphical elements or imagery to a user/viewer.

The display device 320 may be configured to receive a record command, and, responsive to the record command, the display device 320 may generate a display recording of visual content 325 displayed by the display device 320. Such a display recording may include a recording of what visual content is displayed on the display screen 330 and, because the recording may be generated at the point of display (e.g., such as the display device), the display recording may include an original, unmodified capture of the displayed visual content. The display recording may, for example, include the original instructions (e.g., code or graphic controller instructions) provided by a graphic controller unit of the display device 320 to the display screen 330.

In this exemplary embodiment, a record command may include both: a start command for instructing the display device 320 to begin recording of visual content 325 displayed by the display device 320 and a stop command for instructing the display device 320 to end recording of visual content 325 displayed by the display device 320. Accordingly, a record command may control the generation of a display recording.

Further, the display device 320 may generate a display recording with associated timestamps. Such timestamps may identify the timing at which the display recording was started and/or stopped, thereby indicating the capture time of the display recording.

The system 300 may also include a video processor 340 that may obtain the source video (e.g., from the recording device 310) and may obtain the display recording (e.g., from the display device 320). Responsive to the visual content displayed by the display device 320 being visible in the FOV of the source video, the video processor may incorporate the display recording into the source video. In particular, the video processor may incorporate the display recording so as to replace the visual content displayed by the display device visible in the source video with the display recording. In this example, the video processor 340 may employ the timestamps of the display recording to incorporate the display recording into the source video at the appropriate timing location(s) within the source video.

In the exemplary embodiment of FIG. 3, the system 300 may also include a control unit 350 that may generate a record command and may communicate the record command to the display device 320. In one embodiment, the control unit 350 may be include in the recording device 310. In another embodiment, the control unit 350 may be communicatively coupled to the recording device 310. In particular, the control unit 350 may process (e.g., in real-time) the source video captured by the recording device 310 with an object recognition algorithm to detect if/when the visual content displayed by the display device 320 is visible in the FOV of the source video. Based on the detection result(s), the control unit 350 may generate a record command.

Further, in the embodiment of FIG. 3, the display device 320 may communicate a device identifier to the control unit 350. The device identifier in this example may include machine-readable code that may be detected and read by either the recording device 310 and/or the control unit 350. For instance, the device identifier may include: a QR code, a barcode, machine-readable identifier, wireless identification tag, or a RFID. Responsive to receiving the device identifier, the control unit 350 may establish a communication link with the display device 320 for communicating the record command.

The system 300 of FIG. 3 may also include a motion detection unit 360 to detect motion of at least one of the recording device 310 and the display device 320. In one embodiment, the motion detection unit 360 may be include in the recording device 310. In another embodiment, the motion detection unit 360 may be communicatively coupled to the recording device 310. Based on the detected motion, the motion detection unit 360 may generate a motion signal and communicate with the control unit 350. The control unit 350 may generate the record command based on the received motion signal. This may enable control of display recording generation so that visual content of the display device may be captured when the recording device or display moves. Such an approach may be useful for replacing content of the source video that is blurred as a result of relative movement between the recording device and display device.

Figure 4:
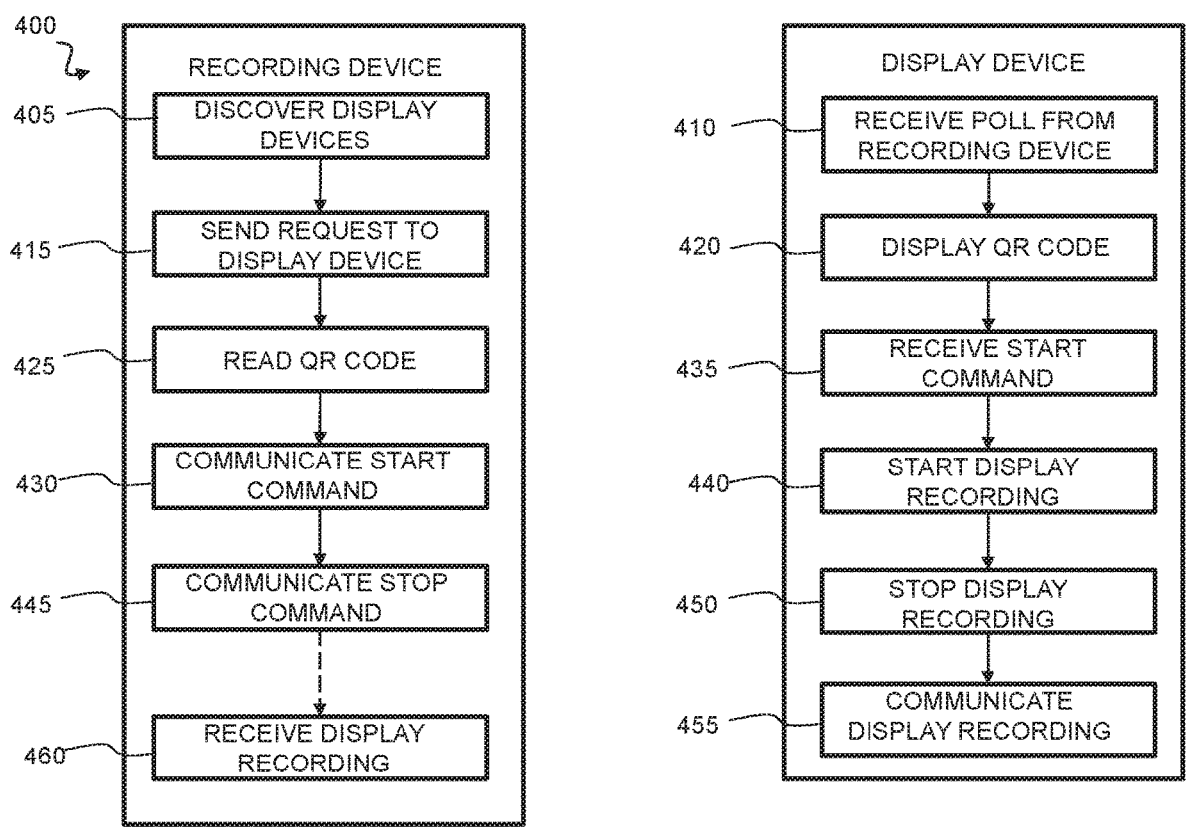
FIG. 4 is an operational flowchart illustrating a process for incorporating content displayed by a display device into a video recording of the display device according to at least one embodiment.

Referring now to FIG. 4, an operational flowchart illustrating an exemplary computer-implemented process 400 for incorporating content displayed by a display device into a video recording of the display device. In this example, a recording device (e.g., a digital video capture device) and a display device (e.g., a tablet computer or mobile phone) may each be equipped with a communication interface to enable communication therebetween.

In step 405, the recording device attempts to identity nearby display devices that may be within a field of view of a source video that it captures/records. Here, the recording device broadcasts a poll signal for reception by display device.

In step 410, the display device receives the poll signal from the recording device. In response to the received poll signal, the display device broadcasts a response/reply for indicating that is has received the poll signal. The response/reply comprises an identifier (e.g., address or network ID) of the display device for facilitating one-to-one communication between the recording device and the display device.

In response to receiving the response/reply from the display device, the recording device transmits a request to the display device in step 415. The request is configured to prompt the display device to provide information for establishing a communication link and enabling the provision of command signals to the display device.

In step 420, the display device displays a machine-readable QR code in response to receiving the request from the recording device. Here, the QR code comprises information for enabling the provision and use of command signals to control recording of visual content displayed by the display device. For example, the QR code may comprise start/stop command requirements, recording parameters or requirements, time/clock synchronization information, hostname of the display device (e.g., "joes-personal-computer"), IP address(es) and port, unique ID, and/or bandwidth constraints.

When the QR code is visible to the recording device (e.g., when the QR code is visible in the field of view of the recording device), the recording device detects and reads the QR code in step 425 to extract the various information contained therein. Based on the QR code detection, the recording device then communicates a start command to the display device in step 430.

The start command is received by the display device in step 435. The display device then starts to generate a display recording in step 440. The display recording comprises a recording of visual content displayed by the display device. This may, for example, be obtained by intercepting/capturing instructions provided to the display screen of the display device, thereby capturing a raw/un-altered version of the visual content displayed by the display device.

When the QR code is not visible to the recording device (e.g., when the QR code is not visible in the field of view of the recording device), the recording device communicates a stop command to the display device in step 445.

Responsive to receiving the stop command, the display device then stops generating a display recording in step 450. The display device then communicates the generated display recording (e.g., the display recording captured between reception of the start and stop command) to the recording device in step 455.

The display recording is then received by the recording device in step 460.

From the above description, it will be understood that the process 400 of FIG. 4 provides for the capture of visual content at its point/source of display, and this captured "display recording" may then be made available to the recording device for incorporation in a video recording. By capturing the displayed visual content at its source (e.g., at the display device), an original, un-altered and high-quality version of the visual content may be made available and incorporated (e.g., interlaced, overlaid etc.) within the video recording captured by the recording device. This may enable poorly represented visual content within the video recording to be replaced with a higher-quality representation of the visual content. Visual content displayed by the display device may therefore be represented at high-quality within the video recording.

Embodiments may therefore enable seamless integration of a video recording (e.g., source video) and one or more display recordings by using identifiers on display devices to then identify and instruct the devices to start a display recording. Once the source video recording ends, timestamps included in the display recordings may be used to incorporate (e.g., interlace or insert) the display recordings into the source video so as to provide a single output video.

Figure 5:
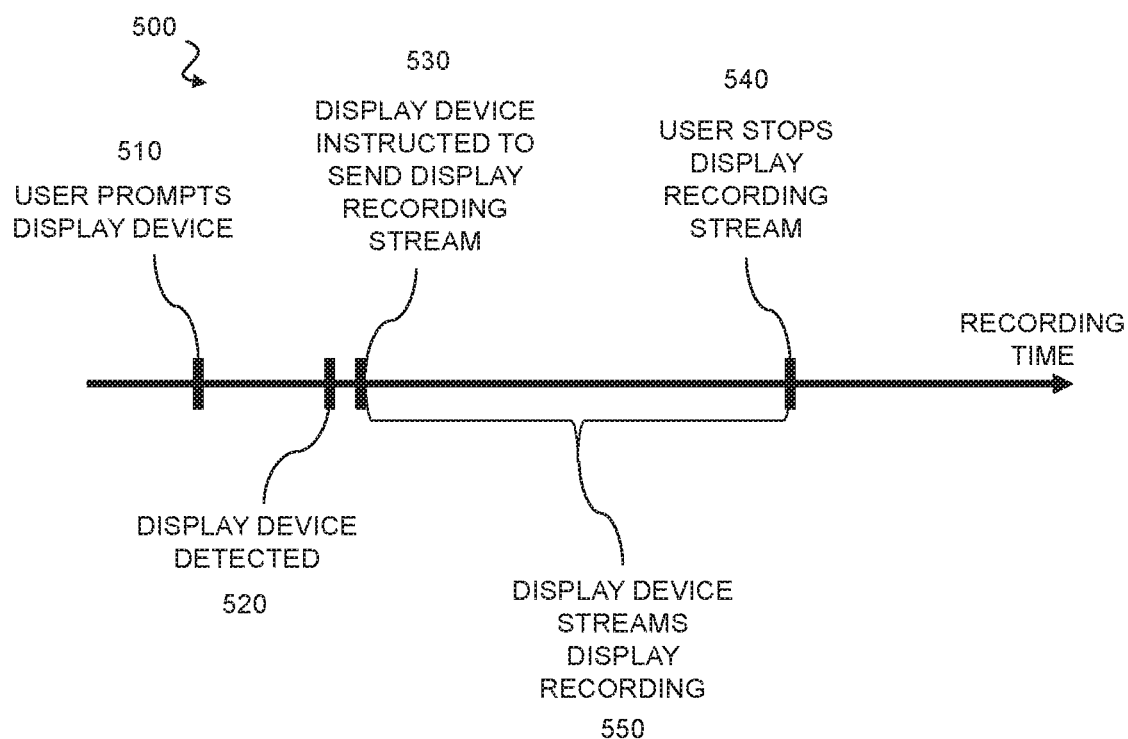
FIG. 5 is an exemplary timeline illustrating a video recording that is in progress according to at least one embodiment.

Referring now to FIG. 5, an exemplary timeline 500 of a video recording that is in progress, wherein the elapsed recording time increases from left to right according to at least one embodiment is depicted.

At a point in time 510, a user prompts devices on the local network (e.g., in the vicinity of the recording device) to identify themselves (e.g., via color, number, QR code flash on screen, or some other identification mode) by pressing a user interface control on recording device.

Next, at a point in time 520, a single identifier is detected in the video recording captured by the recording device. Based on the identifier, the display device is identified and selected. If multiple identifiers are detected, the user may be further prompted to select at least one display device (e.g., by focusing camera on identifier, or selecting from another user interface control). In this way, multiple display devices may be catered for (thus potentially enabling the incorporation of visual content from multiple display devices).

After identifying the display device, the recording device communicates with the display device at a point time 530. In doing so, the recording device instructs the display device to start streaming a recording of the visual content displayed by the display device (e.g., a display recording) to the recording device. The streaming of display recording continues until the user prompts the display device to stop streaming the display recording at a point in time 540. Accordingly, the display device streams the display recording to the recording device for a time period 550.

In at least one embodiment, the display recording may be saved locally at the display device and may then be transferred to the recording device after the display recording is stopped/ended.

Post-processing may then be used to join the source video captured by the recording device and the display re-cording(s). This may, for instance, employ a networked video editing/processing system that automatically combines the display recording(s) into source video. It will be appreciated that embodiments may cater for the communication and incorporation of display recordings from a plurality of different devices. For instance, a user may be able to select from multiple display recordings and/or may have multiple display recordings incorporated into the source video (e.g., side-by-side).

Figure 6:
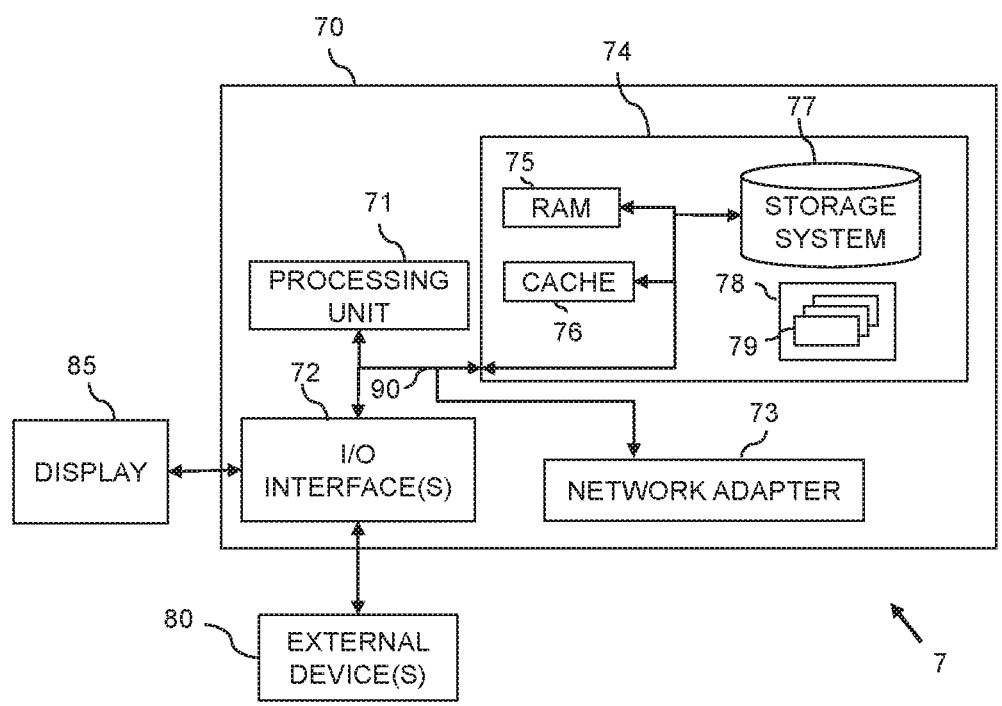
FIG. 6 is a block diagram of internal and external components of computers and servers according to at least one embodiment.

By way of further example, as illustrated in FIG. 6, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 may typically include a variety of computer system readable media. Such media may be any available media that is accessible by computer system/server 70, and it includes both volatile and non-volatile media, removable and non-removable media.

System memory 74 may include computer system readable media in the form of volatile memory, such as random-access memory (RAM) 75 and/or cache memory 76. Computer system/server 70 may further include other removable/non-removable, volatile/non-volatile computer system storage media. By way of example only, storage system 77 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, one or more devices that enable a user to interact with computer system/server 70, and/or any devices (e.g., network card, modem) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
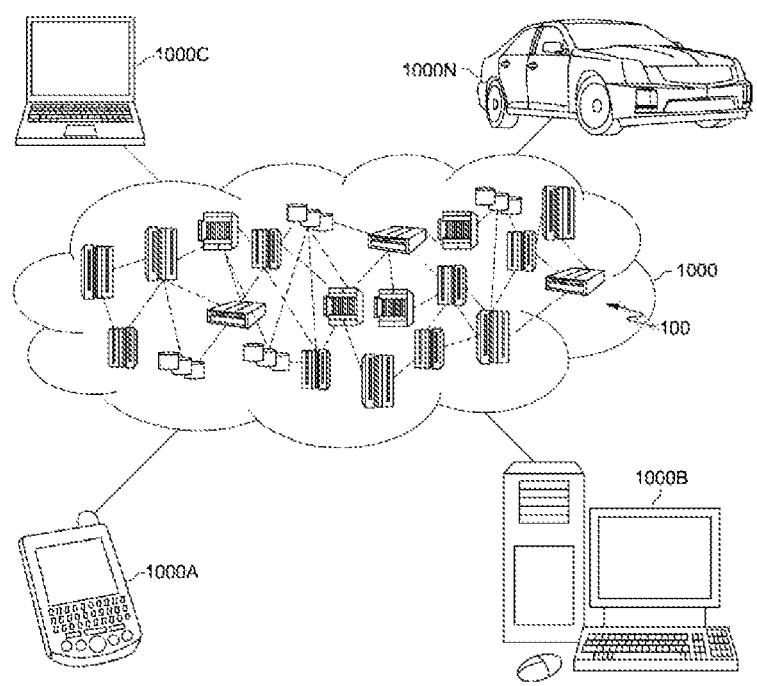
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
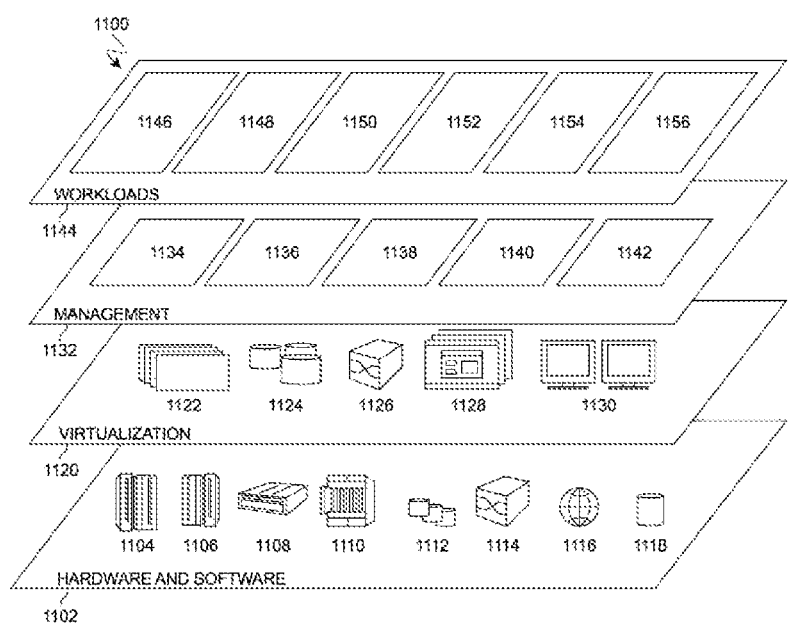
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture-based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and video capturing 1156. A video capturing program provides a way to incorporate content displayed by a display device into a video recording of the display device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for video recording of a display device, the method comprising:
   recording, with a recording device, a source video having a field of view;
   in response to a record command, controlling a display device to generate a display recording of a visual content displayed by the display device;
   obtaining the source video and the display recording; and
   in response to the visual content displayed by the display device being visible in the field of view of the source video, incorporating the display recording into the source video so as to replace the visual content displayed by the display device visible in the source video with the display recording.

2. The method of claim 1, further comprising:
   generating the record command; and
   communicating the record command with the display device.

3. The method of claim 2, wherein generating the record command comprises:

processing the source video with an object recognition algorithm to detect if the visual content displayed by the display device is visible in the field of view of the source video; and generating the record command based on a detection result.

4. The method of claim 2, further comprising:

in response to receiving a device identifier from the display device, establishing a communication link with the display device for communicating the record command.

5. The method of claim 4, wherein the device identifier is selected from the group consisting of a color, a quick response (QR) code, a barcode, a machine-readable identifier, a wireless identification tag, and a radio-frequency identification (RFID).

6. The method of claim 2, further comprising:

detecting, by the recording device, a motion of a selection from the group consisting of the recording device and the display device;

generating a motion signal based on the detected motion; and generating the record command based on the generated motion signal.

7. The method of claim 1, wherein the display recording comprises at least one timestamp, and wherein incorporating the display recording into the source video is based on the at least one timestamp.

8. The method of claim 1, wherein the record command is selected from the group consisting of a start command for instructing the display device to begin recording the visual content displayed by the display device and a stop command for instructing the display device to end recording the visual content displayed by the display device.

9. The method of claim 1, further comprising:

receiving, by a selection from the group consisting of the recording device and a video processor, the display recording from the display device.

10. A computer system for video recording of a display device, comprising:

one or more processors, one or more computer readable memories, one or more computer readable tangible storage media, and program instructions stored on at least one of the one or more computer readable tangible storage media for execution by at least one of the one or more processors via at least one of the one or more memories, wherein the program instructions are directed to perform a method comprising:

recording, with a recording device, a source video having a field of view;

in response to a record command, controlling a display device to generate a display recording of a visual content displayed by the display device;

obtaining the source video and the display recording; and in response to the visual content displayed by the display device being visible in the field of view of the source video, incorporating the display recording into the source video so as to replace the visual content displayed by the display device visible in the source video with the display recording.

11. The computer system of claim 10, further comprising:

generating the record command; and communicating the record command with the display device.

12. The computer system of claim 11, wherein generating the record command comprises:

processing the source video with an object recognition algorithm to detect if the visual content displayed by the display device is visible in the field of view of the source video; and generating the record command based on a detection result.

13. The computer system of claim 11, further comprising:

in response to receiving a device identifier from the display device, establishing a communication link with the display device for communicating the record command.

14. The computer system of claim 13, wherein the device identifier is selected from the group consisting of a color, a quick response (QR) code, a barcode, a machine-readable identifier, a wireless identification tag, and a radio-frequency identification (RFID).

15. The computer system of claim 11, further comprising:

detecting, by the recording device, a motion of a selection from the group consisting of the recording device and the display device;

generating a motion signal based on the detected motion; and generating the record command based on the generated motion signal.

16. The computer system of claim 10, wherein the display recording comprises at least one timestamp, and wherein incorporating the display recording into the source video is based on the at least one timestamp.

17. A computer program product for video recording of a display device, comprising:

one or more computer readable tangible storage media and program instructions stored on at least one of the one or more computer readable tangible storage media, the program instructions executable by a processor to cause the processor to perform a method comprising:

recording, with a recording device, a source video having a field of view;

in response to a record command, controlling a display device to generate a display recording of a visual content displayed by the display device;

obtaining the source video and the display recording; and in response to the visual content displayed by the display device being visible in the field of view of the source video, incorporating the display recording into the source video so as to replace the visual content displayed by the display device visible in the source video with the display recording.

18. The computer program product of claim 17, further comprising:

generating the record command; and communicating the record command with the display device.

19. The computer program product of claim 18, wherein generating the record command comprises:

processing the source video with an object recognition algorithm to detect if the visual content displayed by the display device is visible in the field of view of the source video; and generating the record command based on a detection result.

20. The computer program product of claim 18, further comprising:

in response to receiving a device identifier from the display device, establishing a communication link with the display device for communicating the record command.

* * * * *